United States Patent
Kozlov et al.

(10) Patent No.: US 11,845,675 B2
(45) Date of Patent: Dec. 19, 2023

(54) WATER DISTILLATION SYSTEM

(71) Applicant: GTI ENERGY, Des Plaines, IL (US)

(72) Inventors: Aleksandr Kozlov, Buffalo Grove, IL (US); Yaroslav Chudnovsky, Skokie, IL (US)

(73) Assignee: GTI ENERGY, Des Plaines, IL (US)

( * ) Notice: Subject to any disclaimer, the term of this patent is extended or adjusted under 35 U.S.C. 154(b) by 0 days.

(21) Appl. No.: 17/848,524

(22) Filed: Jun. 24, 2022

(65) Prior Publication Data

US 2022/0411289 A1 Dec. 29, 2022

Related U.S. Application Data

(60) Provisional application No. 63/214,470, filed on Jun. 24, 2021.

(51) Int. Cl.
| | |
|---|---|
| *B01D 1/28* | (2006.01) |
| *C02F 1/16* | (2023.01) |
| *C02F 1/04* | (2023.01) |
| *C02F 1/12* | (2023.01) |
| *C02F 1/06* | (2023.01) |

(Continued)

(52) U.S. Cl.
CPC ............ *C02F 1/048* (2013.01); *B01D 1/0058* (2013.01); *B01D 1/20* (2013.01); *B01D 1/28* (2013.01); *B01D 5/006* (2013.01); *B01D 5/0057* (2013.01); *C02F 1/06* (2013.01); *C02F 1/12* (2013.01); *C02F 1/16* (2013.01); *C02F 2201/009* (2013.01); *C02F 2303/10* (2013.01)

(58) Field of Classification Search
CPC ................ C02F 1/04–18; B01D 5/0057–0066
See application file for complete search history.

(56) References Cited

U.S. PATENT DOCUMENTS

| | | | | |
|---|---|---|---|---|
| 2,449,587 A | * | 9/1948 | Chambers | B01D 1/16 203/99 |
| 3,671,404 A | * | 6/1972 | Meckler | B01J 37/20 202/187 |

(Continued)

FOREIGN PATENT DOCUMENTS

WO  WO-2020033984 A1 * 2/2020 ........... B01D 1/0035

OTHER PUBLICATIONS

PE2E translation of WO 2020/033984 A1.*

(Continued)

*Primary Examiner* — Jonathan Luke Pilcher
(74) *Attorney, Agent, or Firm* — Pauley Erickson & Swanson

(57) ABSTRACT

A method and apparatus for recovering distilled water from wastewater. The method and apparatus evaporates water vapor from a wastewater stream into a moving airflow, collects collecting distilled water from the water vapor, and powers the moving airflow and the collecting distilled water with a thermoelectric generator. The apparatus includes a self-regenerative distillation unit, with an evaporating channel, a condensing channel, and a distilled water outlet. The thermoelectric generator includes a hot shoe side in combination with the wastewater stream, and a cold shoe side in combination with the distilled water outlet. The thermoelectric generator powers a fan or blower connected to the evaporating channel and/or a water pump connected to the distilled water outlet.

16 Claims, 1 Drawing Sheet

(51) Int. Cl.
  *B01D 1/20* (2006.01)
  *B01D 5/00* (2006.01)
  *B01D 1/00* (2006.01)

(56) References Cited

U.S. PATENT DOCUMENTS

| | | | | |
|---|---|---|---|---|
| 3,801,284 | A * | 4/1974 | Meckler | C02F 1/042 202/187 |
| 6,911,121 | B1 | 6/2005 | Beckman | |
| 7,431,805 | B2 * | 10/2008 | Beckman | B01D 3/10 202/160 |
| 8,252,092 | B2 * | 8/2012 | Govindan | B01D 1/14 95/231 |
| 8,647,477 | B2 * | 2/2014 | Govindan | B01D 1/16 95/204 |
| 8,766,084 | B2 * | 7/2014 | Kannari | F22B 1/16 136/205 |
| 9,048,384 | B2 * | 6/2015 | Kannari | F22B 1/006 |
| 9,174,164 | B2 * | 11/2015 | Glanville | B01D 53/268 |
| 10,472,258 | B2 * | 11/2019 | Al-Qutub | B01D 3/346 |
| 2005/0121304 | A1 * | 6/2005 | Beckman | B01D 1/26 202/160 |
| 2012/0205236 | A1 * | 8/2012 | Govindan | B01D 1/14 203/11 |
| 2013/0206573 | A1 * | 8/2013 | Kannari | F22B 1/06 136/212 |
| 2013/0213450 | A1 * | 8/2013 | Kannari | H10N 10/13 136/205 |
| 2015/0182909 | A1 * | 7/2015 | Glanville | B01D 71/10 96/14 |
| 2017/0152156 | A1 * | 6/2017 | Al-Qutub | C02F 1/04 |
| 2017/0167120 | A1 * | 6/2017 | Sarikaya | B01D 5/009 |
| 2021/0206658 | A1 * | 7/2021 | Budil | B01D 1/305 |

OTHER PUBLICATIONS

Manchanda, H., et al., "Study of Water Desalination Techniquest and a Review on Active Solar Distillation Methods," AIChE, 2017, vol. 37, p. 444-464 (Abstract Only).
Beckman, J.R., "Dewvaporation Desalination 5,000-Gallon-Per-Day Pilot Plant." Desalination and Water Purification Research and Development Program Report No. 120, Jun. 2008, 87pp.
Gas Technology Institute, Chudnovsky, et al., "Integrated Industrial Wastewater Reuse Via Heat Recovery." California Energy Commission, Publication No. CEC-500-2015-049, Mar. 2015, 59pp.
Narayan, G.P., et al., "Thermal Design of the Humidification Dehumidification Desalination System: An experimental investigation." Int'l J of Heat and Mass Transfer, 2013, 58, pp. 740-748 (Abstract Only).

* cited by examiner

WATER DISTILLATION SYSTEM

CROSS REFERENCE TO RELATED APPLICATION

This application claims the benefit of U.S. provisional application, Ser. No. 63/214,470, filed on 24 Jun. 2021. The co-pending provisional application is hereby incorporated by reference herein in its entirety and is made a part hereof, including but not limited to those portions which specifically appear hereinafter.

BACKGROUND OF THE INVENTION

Field of the Invention

This invention relates generally to distilling wastewater and, more particularly, to purifying water by evaporation into an air stream.

Description of Related Art

Reverse osmosis (RO) is a desalination technology. RO is often a preferred desalination technology as many other technologies involve phase changes (boiling), whereas RO employs low-pressure pumps to move water through semi-permeable membranes, resulting in less energy consumption than that involved in a boiling process. One area where RO is ineffective in water purification is in the treatment of water containing nonfilterable suspended particulates.

For more total dissolved solids (TDS) intense aqueous applications such as RO concentrates, waste streams, and seawater, other mechanical and thermal technologies economically compete with RO. For example, in the case of seawater desalination, RO pump pressure can increase to 1,200 psi where feed waters require extensive pretreatment to protect and extend membrane life. The competitive technologies to RO for seawater desalination include mechanical vapor compression (MVC), multi-stage flash distillation, and multi-effect distillation with and without thermal vapor compression.

The MVC needs shaft power to drive its compressor. The motor can be either electrically or thermally driven. For electrically driven MVC, MVC plants consume more electricity than RO units in the same seawater service. The other named processes predominantly use and reuse heat as a main driver to affect a temperature-driving force between boiling and condensing water at staged pressures. Thermally driven plants attempt to reuse applied heat as many times as is economically possible to minimize operating costs. This energy reuse factor economically varies from approximately 6 to 12.

There is a continuing need for improved water purification processes.

SUMMARY OF THE INVENTION

The invention generally relates to improving energy efficiency in water and wastewater treatment. The thermal process embodied in this invention operates below the boiling point of water, uses thermal energy of that water and achieves net-zero energy consumption compared to existing technologies.

The general object of the invention can be attained, at least in part, through using thermal energy contained in water/wastewater. This allows for achieving a net-zero energy consumption in water distillation/treatment processes.

Embodiments of this invention include a method, and the corresponding system/apparatus, for recovering distilled water from wastewater. The method includes evaporating water vapor from a wastewater stream into a moving airflow, collecting distilled water from the water vapor, and powering the moving airflow and the collecting distilled water with a thermoelectric generator.

The water and wastewater recovery technology of this invention is based on an indirect self-regenerative evaporation-condensation process. Wastewater is purified (distilled) by evaporation into an air stream, followed by self-regenerative condensation of water vapor from humidified air at a relatively low temperature. The main components of the water distillation system of embodiments of this invention include a self-regenerative distillation unit and a thermoelectric generator (TEG).

Embodiments of this invention provide a method including, and the corresponding system for implementing, steps of: purifying wastewater with a self-regenerative distillation unit, wherein the self-regenerative distillation unit comprises an evaporating channel and a condensing channel; evaporating the wastewater into an air stream within the evaporating channel to provide humidified air; condensing water vapor from the humidified air within the condensing channel to produce distilled water; and generating electricity to power the self-regenerative distillation unit using a thermoelectric generator. The thermoelectric generator powers a fan or blower for moving the air stream and a pump for collecting the distilled water.

In embodiments, the wastewater desirably heats a first side of the thermoelectric generator upstream of the evaporating channel and the distilled water cools a second side of the thermoelectric generator. The wastewater at and/or upstream of the thermoelectric generator can be heated with an external heat source, and/or in a heat exchanger with a distilled water flow from the thermoelectric generator.

In embodiments of this invention, a temperature of the moving airflow is reduced upstream of the evaporating channel. The self-regenerative distillation unit desirably includes a dry channel upstream of the evaporating channel, for cooling ambient air within the dry channel.

In embodiments of this invention, a pressure of the airflow is reduced in the evaporating channel. For example, a sub-atmospheric pressure is maintained within the evaporating channel to reduce a dew point of the air stream. The pressure of the air stream can be increased in the condensing channel, downstream of the evaporating channel, to increase a dew point of the air stream.

The invention further includes a system for purifying a wastewater stream, such as by any method embodiment discussed herein. The system includes a self-regenerative distillation unit, including an evaporating channel, a condensing channel, and a distilled water outlet. The system further includes a thermoelectric generator including a hot shoe side in combination with the wastewater stream, and a cold shoe side in combination with the distilled water outlet. The thermoelectric generator provides electric power to a fan or blower connected to the evaporating channel and a water pump connected to the distilled water outlet. The self-regenerative distillation unit can further include a dry channel upstream of the evaporating channel and configured to cool an air stream to the evaporating channel.

In embodiments, the TEG is used to power an air fan and a water pump, and to achieve a net-zero energy consumption. The self-regenerative distillation unit of embodiments of this invention includes a combination of three adjacent channels: dry, evaporating, and condensing. Ambient air is cooled down in the dry channel, providing a driving force for water condensation in the condensing channel. Deep cooling (below wet bulb) of ambient air in the dry channel provides a higher evaporation rate (compared to other evaporative technologies) in the evaporating channel, so that more wastewater can be evaporated in the channel. This results in more water condensation in the adjacent condensing channel.

The higher the temperature of wastewater, the more distilled water can be produced for reuse. Waste heat or alternative thermal energy can be used to preheat the wastewater and to drastically increase the efficiency of the distillation process. The driving force for evaporation and condensation processes is characterized by the difference between the temperature of hot saturated air exiting the evaporating channel and the dew point temperature of ambient air. Maintaining a sub-atmospheric pressure in the evaporating channel reduces a dew-point temperature of the air and makes the evaporation process more intense. Overpressure in the condensing channel increases the dew point temperature of the air in the condensing channel which also makes the condensing process more intense.

Other objects and advantages will be apparent to those skilled in the art from the following detailed description taken in conjunction with the appended claims and drawings.

DETAILED DESCRIPTION OF THE INVENTION

Figure 1:
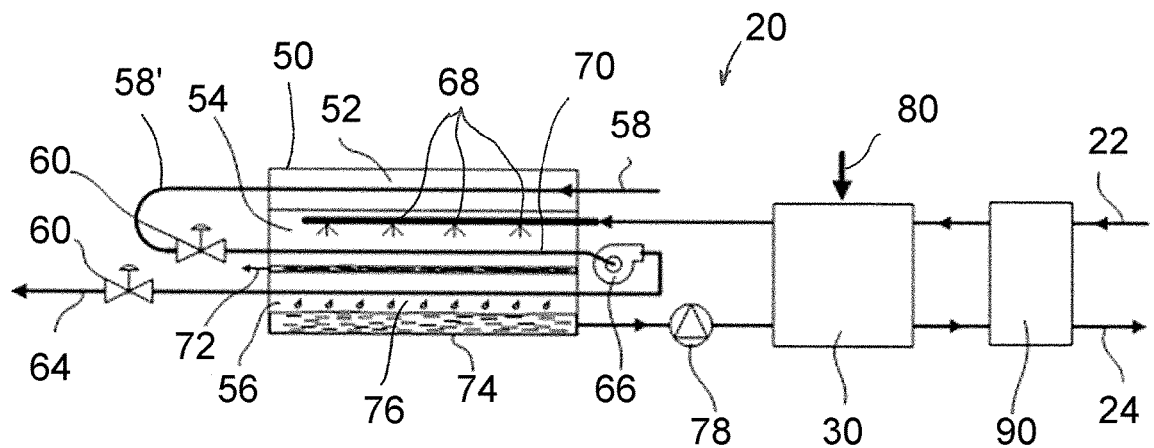
FIG. 1 shows a schematic view of a net-zero energy consumption self-regenerative distillation system according to one embodiment of the invention.

The present invention provides a water and wastewater recovery technology based on an indirect self-regenerative evaporation-condensation process, such as illustrated in FIG. 1. In FIG. 1, wastewater is purified (distilled) by evaporation into an air stream, followed by self-regenerative condensation of water vapor from humidified air at a low temperature.

FIG. 1 shows a system 20 for recovering distilled water 24 from a wastewater stream 22. The water distillation system 20 includes a self-regenerative distillation unit 50 and a thermoelectric generator (TEG) 30. The TEG 30 desirably is used to power components of the system 20 and the distillation unit 50, preferably resulting in a net-zero energy consumption.

The distillation unit 50 includes a combination of several types of separated channels. In the illustrated embodiment, the channels include a dry channel 52, an evaporating channel 54, and a condensing channel 56. Ambient air 58 is preferably cooled in the dry channel 52, thereby providing a driving force for water condensation in the condensing channel 56. Deep cooling (below wet bulb) of ambient air 58 in the dry channel 52 provides an increased evaporation rate in the evaporating channel 54 so that more wastewater can be evaporated in the channel 54. This results in more water condensation in the adjacent condensing channel 56. The higher the temperature of the wastewater 22, the more water can be recovered for further reuse.

The distillation unit 50 includes diaphragm valves 60 for controlling the pressures of air in the channels. One or more fans or blowers 66 is used to circulate the air through and between the three channels 52, 54, 56. The fan 66 and the diaphragm valves 60 can be coordinated to reduce pressure (e.g. maintain a sub-atmospheric pressure) of the airflow 70 within the evaporating channel 54 to reduce a dew point of the airflow 70, and/or to increase the pressure of the airflow 76 above atmospheric pressure in the condensing channel 56.

The cooled ambient air 58' from the dry channel 52 is introduced through the evaporating channel 54. In the evaporating channel 54, the wastewater 22 is evaporated by spraying through nozzles 68 into the moving airflow 70. Excess wastewater that is not evaporated into the airflow 70 is collected by a drain 72 in the evaporating channel 54. Distilled water 74 is condensed from the humid airflow 76 and collected in the condensing channel 56. A water pump 78 can be used to move the distilled water 74 from the distillation unit 50.

In the embodiment of FIG. 1, the wastewater 22 is applied to or against the 'hot side' of the TEG 30 and the distilled water 74 is applied to or against the 'cold side' of the TEG 30. The temperature gradient provided by the wastewater heating a first side of the TEG 30 and the distilled water cooling the second side of the TEG 30 results in production of electrical power to run the system (e.g., fans, valves, sensors, controllers, etc.).

In embodiments of this invention, such as shown in FIG. 1, waste heat, which is typically available at an operation site, is applied (arrow 80) to preheat wastewater and to increase the efficiency of the distillation process. Additionally or alternatively, thermal energy (solar, geothermal, combustion, etc.) can also be used to preheat the wastewater. A heat exchanger 90 can also be used to transfer heat from the distilled water 24 downstream of the TEG 30 to the initial wastewater 22 when the wastewater temperature is lower than distilled water temperature. The driving force for evaporation and condensation processes in accordance with this invention is characterized by a difference between the temperature of hot saturated air exiting the evaporating channel and the dew point temperature of ambient air. Maintaining a sub-atmospheric pressure in the evaporating channel will reduce the dew-point temperature of the air and will make the evaporation process more intense. Overpressure in the condensing channel will increase the dew point temperature of the air in the condensing channel and will make the condensing process more intense. This increases the temperature difference between an evaporating stream and a condensing stream, and as a result, leads to more intense heat and mass transfer amongst the channels.

These features of the subject invention, such as, self-regenerative evaporation-condensation, pressure regulation, thermoelectric power generation, and using waste heat or alternative thermal energy, results in an efficient water recovery process providing, or at least approaching, net-zero energy consumption for water resource recovery.

The water resource recovery system of this invention operates at low water temperature (below boiling) and no vacuum or high pressure is required to purify the water. Therefore, minimal energy is needed to carry out the wastewater recovery process. The TEG generates electricity from wastewater thermal energy and uses it for powering the water pump, air fan, and control system, zeroing the system's net power consumption.

Figure 2:
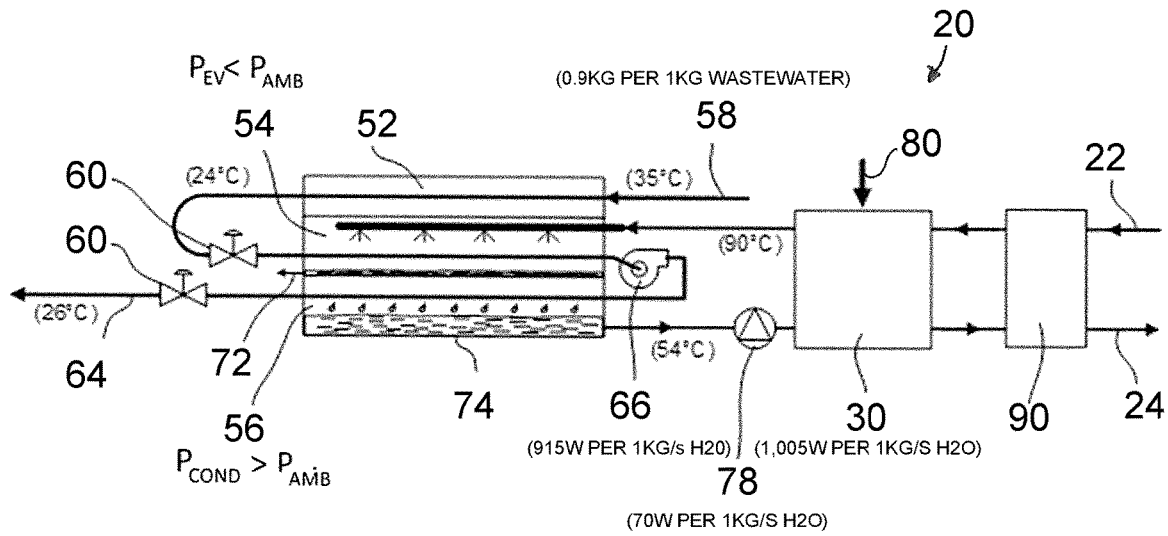
FIG. 2 shows a schematic view of a self-regenerative distillation system according to one embodiment of the invention, with example energy and flow value.

FIG. 2 shows an example of the estimated energy balance of the wastewater recovery process of FIG. 1, according to one embodiment of this invention. Energy indicators are given for 1 kg/s of treated wastewater 22. The air fan 66 consumes 915 W per 1 kg/s of treated water, the water pump 78 consumes 70 W per 1 kg/s of treated water, while the TEG 30 generates 1,005 W per 1 kg/s of treated water providing power for the air fan, water pump, and also for a control system. The efficiency of the TEG 30 is 0.8% at this water temperature level.

In embodiments of this invention, a high system efficiency (distillation rate) is achieved when water is preheated to a temperature of over 60° C. The highest distillation rate achieved is approximately 55% of evaporated water at this temperature level, although other distillation rates may also be achieved. The distillation rate can be substantially increased, potentially up to 100% while achieving net-zero energy consumption, by increasing the temperature level.

Embodiments of this invention are targeted for small capacity thermal distillation units (<2,000 m3/day) enabling a wastewater thermal energy consumption and capital cost with LCOW of $0.5/m3 and presuming an alternative thermal energy will enable an LCOH of $0.01/kWhth. This LCOW target is achievable since the distillation system can operate without purchasing heat and electricity or electrical power consumption for the air fan and water pumps. The HMX core can be made and operated similarly to state-of-the-art evaporative air conditioner HMX cores, thus achieving low total lifetime costs.

The water recovery technology of this invention uses an indirect self-regenerative dew-point evaporation (ISDPE) process instead of boiling or wet bulb evaporation. The ISDPE process allows for higher evaporation and condensation rates compared to the wet-bulb evaporation at the same heat level supplied to the system. This is due to the flow arrangement in the HMX of the invention containing a smart combination and multi-packaging of the three channels, including the channel with dry air, which is cooled down below the wet-bulb temperature. This increases the cooling capacity of the system for condensation.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for recovering distilled water from wastewater, the method comprising steps of:
    heating a first side of a thermoelectric generator with a wastewater stream;
    evaporating water vapor from the wastewater stream into a moving airflow;
    collecting distilled water from the water vapor;
    cooling a second side of the thermoelectric generator with the distilled water, thereby generating electric power from a temperature difference across the thermoelectric generator; and
    powering the moving airflow and the step of collecting distilled water with the electric power from the thermoelectric generator.

2. The method of claim 1, wherein the thermoelectric generator powers a fan or blower for the moving airflow and a pump for the collecting distilled water.

3. The method of claim 1, wherein the evaporating and the collecting are performed by a distillation unit including an evaporating channel and a condensing channel.

4. The method of claim 3, further comprising reducing a temperature of the moving airflow upstream of the evaporating channel.

5. The method of claim 3, further comprising reducing a pressure of the moving airflow in the evaporating channel.

6. The method of claim 5, further comprising increasing a pressure of the airflow in the condensing channel, the condensing channel being downstream of the evaporating channel.

7. The method of claim 5, further comprising maintaining a sub-atmospheric pressure of the airflow in the evaporating channel to reduce a dew point of the airflow.

8. The method of claim 7, further comprising increasing the pressure of the airflow above atmospheric pressure in the condensing channel, the condensing channel being downstream of the evaporating channel.

9. The method of claim 1, further comprising heating the wastewater at and/or upstream of the thermoelectric generator.

10. The method of claim 9, further comprising heating the wastewater in a heat exchanger with a distilled water flow from the thermoelectric generator.

11. A method for recovering distilled water from wastewater, the method comprising steps of:
    purifying wastewater with a distillation unit, wherein the distillation unit comprises an evaporating channel and a condensing channel;
    evaporating the wastewater into an air stream within the evaporating channel to provide humidified air;
    condensing water vapor from the humidified air within the condensing channel to produce distilled water;
    generating electricity with a thermoelectric generator by heating a first side of the thermoelectric generator with wastewater upstream of the evaporating channel and cooling a second side of the thermoelectric generator with the distilled water; and
    powering the distillation unit using the electricity from the thermoelectric generator.

12. The method of claim 11, wherein the thermoelectric generator powers a fan or blower for moving the air stream and a pump for collecting the distilled water.

13. The method of claim 11, further comprising heating the wastewater at and/or upstream of the thermoelectric generator with an external heat source and/or in a heat exchanger with a distilled water flow from the thermoelectric generator.

14. The method of claim 11, wherein the distillation unit comprises a dry channel upstream of the evaporating channel, and further comprising cooling ambient air with the dry channel.

15. The method of claim 14, further comprising maintaining a sub-atmospheric pressure within the evaporating channel to reduce a dew point of the air stream.

16. The method of claim 15, wherein the condensing channel is downstream of the evaporating channel and further comprising increasing pressure of the air stream in the condensing channel.

* * * * *